United States Patent [19]

Myers

[11] Patent Number: 4,831,234
[45] Date of Patent: May 16, 1989

[54] AUTOMATIC WELDING TURNTABLE

[75] Inventor: John E. Myers, Sparks, Nev.

[73] Assignee: Torque Converter Rebuilding Systems, TCRS, Inc., Reno, Nev.

[21] Appl. No.: 126,597

[22] Filed: Nov. 30, 1987

[51] Int. Cl.$^4$ .............................................. B23K 9/12
[52] U.S. Cl. ............................ 219/125.11; 219/136; 219/137 R
[58] Field of Search ............... 219/125.11, 125.1, 136, 219/137 R

[56] References Cited

U.S. PATENT DOCUMENTS

| 4,523,076 | 6/1985 | Laymon | 219/125.1 |
| 4,660,753 | 4/1987 | Kushibe et al. | 219/125.11 |

FOREIGN PATENT DOCUMENTS

| 55-165281 | 12/1980 | Japan | 219/125.11 |
| 57-68291 | 4/1982 | Japan | 219/125.11 |

Primary Examiner—Clifford C. Shaw
Attorney, Agent, or Firm—Chernoff, Vilhauer, McClung & Stenzel

[57] ABSTRACT

An automatic welding turntable for welding together the cut-apart halves of a reconditioned torque converter is tilted to cause the bead of weld to fill the crack between the halves of the torque converter. A motor rotates the torque converter in a first direction while wire is fed to the stinger of a wire-fed arc welder. A sensor and a control circuit cause the torque converter to rotate 360° plus a predetermined increment, stop welding, counter-rotate the predetermined increments, and shut down so that the turntable is set up to complete the next weld of 360° plus the predetermined increment.

8 Claims, 2 Drawing Sheets

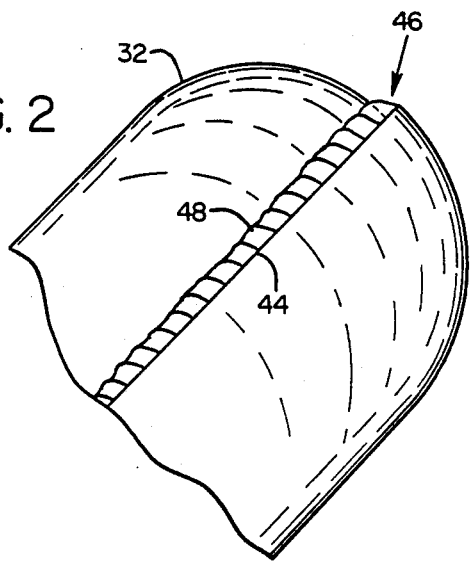
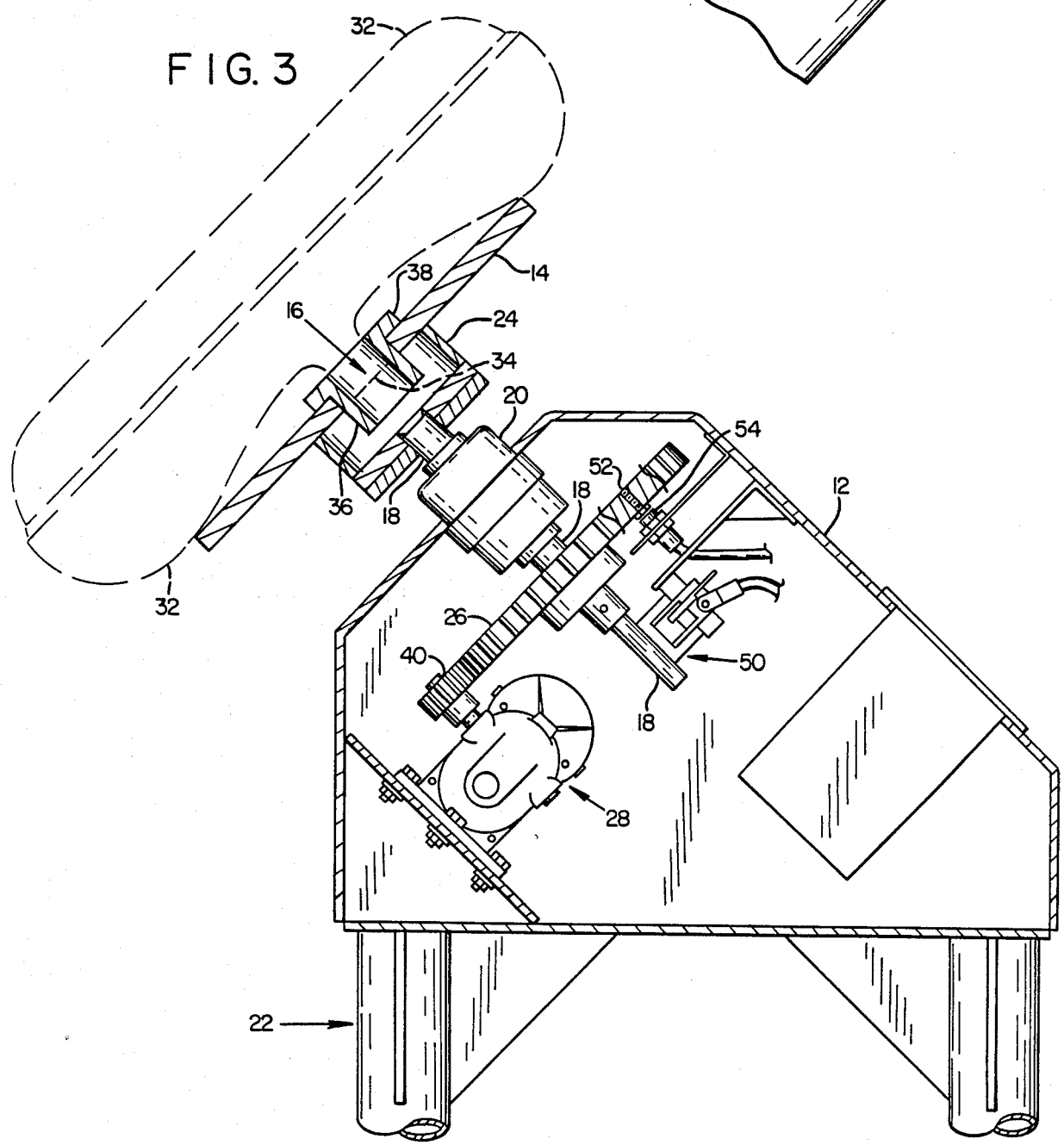

AUTOMATIC WELDING TURNTABLE

FIELD OF THE INVENTION

This invention relates to a welding turntable, and particularly to an automatic welding turntable and a method for welding together cut-apart torque converters.

BACKGROUND OF THE INVENTION

Manually welding together the two halves of a cut-apart torque converter is a painstaking and tedious job. Since the wled must be airtight, great care must be taken in the welding operation. While turntables to rotate a workpiece as it is being manually welded are known, the constant presence of a skilled person is needed to do the actual welding. Most automatic welders need to be manually tended and/or manually shut off.

SUMMARY OF THE INVENTION

The welding turntable of the present invention represents an improvement in that once the operator has started the automatic welding turntable, he may walk away and it will complete a weld of 360° plus a predetermined increment, reposition itself, and shut itself off.

The automatic welding turntable of the present invention includes a turntable for supporting the torque converter, a bearing for permitting the turntable to rotate with respect to a support, a motor to cause the turntable to rotate, and control means for causing the turntable to automatically rotate 360° degrees plus a predetermined increment and stop.

The method according to the present invention includes the steps of positioning a welding device at the seam of a cut-apart torque converter which is supported on a turntable and operating the welding device while the turntable automatically rotates the torque converter 360° plus a predetermined increment, then automatically stopping the welder, counter-rotating the torque converter a predetermined increment, and stopping the motor.

Accordingly, it is a principal object of the present invention to provide an automatic welding turntable for welding together cut-apart torque converters which frees the operator to perform other tasks while the two halves of the torque converter are being welded together.

It is an associated object to provide such a welding turntable which will automatically weld at least 360° around the circumference of a torque converter and stop.

It is a related object to provide such a welding turntable which does not require operator attention to shut it off when the welding operation is finished.

It is a further object to provide a welding turntable which, at the end of one welding operation, will automatically reposition itself to weld 360° plus a predetermined increment in a subsequent welding operation.

It is another object to provide a welding turntable which is tilted so as to cause the bead of weld to sink into the crack between the halves of the cut-apart torque converter.

It is another principal object of the present invention to provide a method for automatically welding together a cut-apart torque converter.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 2 is a fragmentary view of a reconditioned torque converter which has been welded together according to the method of the present invention.

FIG. 3 is a partial cross-sectional view of the automatic welding turntable of FIG. 1.

DETAILED DESCRIPTION OF THE INVENTION

Figure 1:
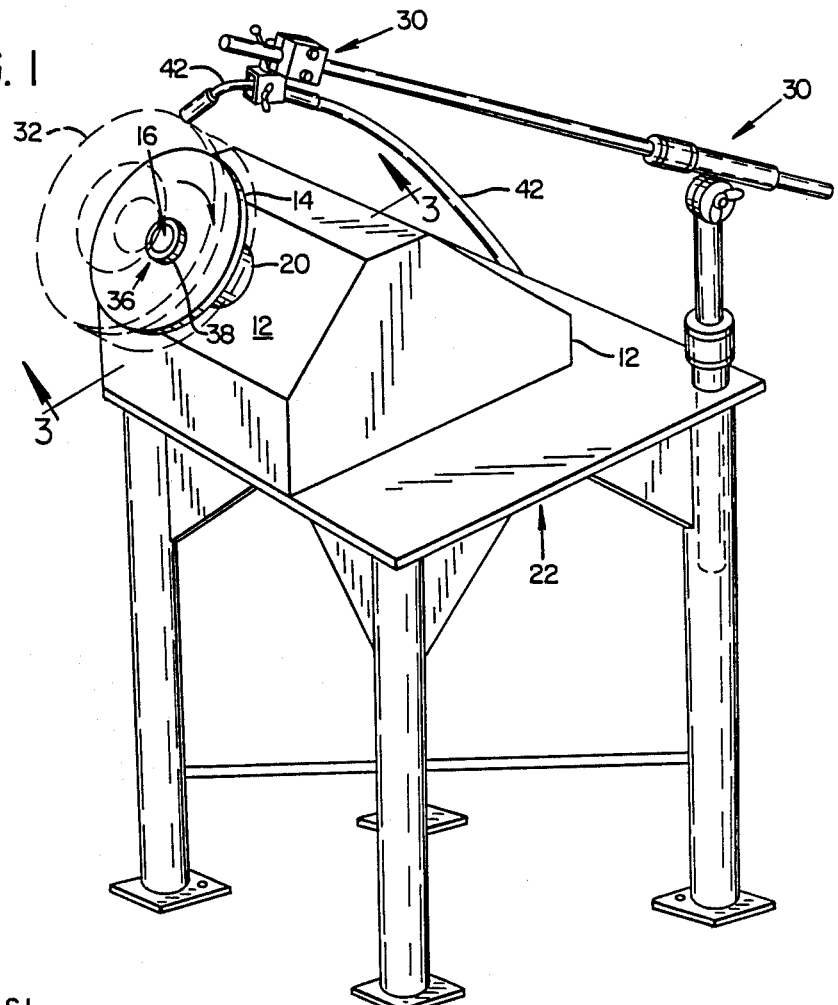
FIG. 1 is a perspective view of the exemplary automatic welding turntable of the present invention.

An exemplary automatic welding turntable as shown in FIGS. 1–3 includes a housing 12 mounted upon a table 22. A flat circular turntable 14 having a central aperture 16 is supported by a shaft 18 passing through a bearing 20 which is fixed to the housing so that the shaft and turntable may rotate with respect to the housing. A hollow cylindrical hub 24 beneath the central aperture of the turntable connects the turntable to the shaft. The shaft, hollow hub, and turntable are arranged so that the turntable rotates about an axis which is perpendicular to the plane of the turntable and which passes through the center of the circular turntable and through the center of the hollow hub. It will also be apparent from the drawings that the turntable and shaft are tilted at a 45° angle.

An adjustable support arm assembly 30 as shown in FIG. 1 is mounted to the table. The arm assembly is adapted to hold and position the stinger 42 of a wire-fed arc welder, not shown.

Inside the housing a circular main gear 26 is fixed to the shaft for rotation therewith and driven by a motor 28 through another gear 40. An electrically grounded spring-loaded carbon brush 50 is maintained in electrical contact with the shaft to ground the torque converter through the shaft, the turntable, and the hub, which are all made out of electrically conductive material such as steel, aluminum or copper.

Turning to FIG. 3, a torque converter 32 which has been split into two halves for reconditioning is reassembled and placed upon the tilted turntable. The torque converter is held on the tiled turntable by the pilot hub 34 of the torque converter which is received in the central aperture of the turntable. A cylindrical bushing 36 having an upper circumferential lip 38 fits snugly into the central aperture, the lip resting on the top surface of the turntable. The inner diameter of the cylindrical bushing is specifically sized to closely receive the pilot hub 34 of the torque converter. The present invention contemplates a variety of such bushings which are specifically sized to receive the various sized pilot hubs of the various torque converters. The fit between the turntable, bushing, and pilot hub is sufficiently close so that there is little play between the separate parts and the friction caused by the close fit is sufficient to cause the torque converter to rotate along with the turntable. Since the bushing is part of the electrical circuit of the arc welder, it is made of electrically conductive material.

As may be seen in FIGS. 2 and 3, the two halves of a cut-apart torque converter define a seam 44 where they meet. The seam will not be smooth, but will the two halves having slightly different circumferences, or which may be formed by the cutting tool when the torque converter was cut-apart prior to reconditioning. The torque converter is arranged on the tilted turntable 5 so that the crack faces up.

According to the method of the present invention, the wire of the arc welder is positioned in the carck and the welder is operated while the turntable rotates to weld the two halves of the torque converter together around the entire circumference of the torque converter. Tilting the torque converter so that the crack faces up uses gravity to draw the molten metal of the weld into the crack rather than permitting it to flow down the cover of the converter. A torque converter having a bead of weld 48 according to the present invention is shown in FIG. 2.

In view of the function of a torque converter, the weld must be airtight. Performing such welding manually can be very tedious and uncomfortable, often leading to less than perfect welds. It is also expensive to perform these time-consuming welds manually. Therefore, the method and the welding turntable of the present invention is adapted to perform the welding automatically--the motor 28 rotating the torque converter past the stinger of the arc welder. The speed at which the welding wire is fed to the arc welder is related to the speed at which the torque converter is rotated.

In order to perform the welding automatically, a magnetically permeable reference such as a metal bolt 52 is attached to the main gear as shown in FIG. 3 to rotate with the torque converter. A magnetic pick-up switch 54 is mounted proximate the path defined by the bolt as the torque converter is rotated. When the metal bolt passes the magnetic pick-up switch, welding stops, a time delay relay is energized, and the motor reverses itself, counter-rotating the torque converter. At the expiration of the time delay period, the motor is shut off.

The newly welded torque converter may be removed from the turntable and another reconditioned, cut-apart torque converter placed on the turntable and the stinger of the arc welder positioned in the crack. The operator pushes the start button and leaves his hand on the start button for a short period of time (approximately two seconds) to ensure that the bolt, passing the magnetic pick-up switch, does not shut the welder off. (Remember, at the end of the previous weld, the motor reversed and counter-rotated the turntable for a short period of time determined by the time delay relay. This operation backed the bolt past the magnetic pick-up switch so that when the turntable is rotated in the forward direction, the bolt passes the switch immediately after the motor is started.)

The operator may then take his hand off the start button and the welder will automatically weld 360° as the turntable rotates the torque converter past the stinger of the arc welder. When the bolt comes around to the magnetic pick-up switch again, the weld will extend 360° around the circumference of the torque converter plus the predetermined increment caused by the reverse rotation of the turntable for the time delay period. Again, the arc welder will be shut off, the time delay relay will be energized and the motor will counter-rotate until expiration of the time delay period. In this fashion, the automatic welding turntable of the present invention is caused to automatically weld 360° plus a predetermined increment ensuring that the weld goes completely around the circumference of the torque converter.

After the operator starts the automatic welding turntable, he may walk away, and the welder will automatically finish the weld, reposition the turntable, and shut itself off. The operator does not need to attend to the welding turntable until he is ready to remove the welded torque converter and replace it with a cut-apart one which needs to be welded together.

Figure 4:
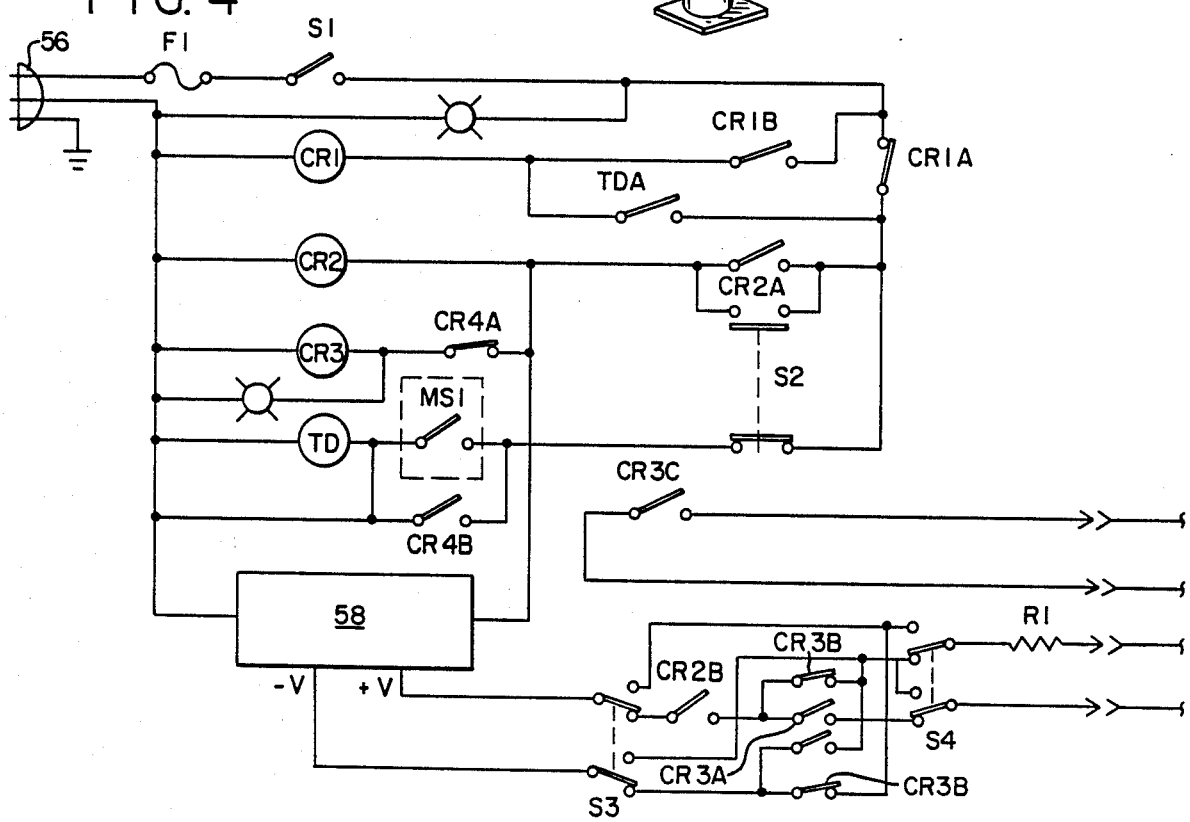
FIG. 4 is a schematic diagram of the electronic circuit which controls the automatic welding turntable.

The electronic circuit which controls the operation of the automatic welding turntable will be explained with respect to FIG. 4. A wall outlet 56 supplies standard AC 120-volt power through a fuse F1 to a power on/off switch S1. When S1 is closed the unit is ready for operation. Start-up is initiated by pressing the start switch S2 which provides poer through closed relay contact CR1A to relays CR2 and CR3. Power also flows through the switch S2 to input L1 on the motor speed control 58. Relay CR2 closes contact CR2A so that after a few seconds the start switch S2 may be released, at which point it springs back to its original position. With CR3 energized, the normally open contacts CR3A close and the normally closed contacts CR3B open. This provides voltages +V and −V on the input contacts of switch S4. The motor (not shown) runs until a complete revolution of turntable 14 occurs. A metal bolt 52 on the turntable triggers magnetic switch MS1 after one revolution and closes it, thus energizing relay CR4 which closes relay contacts CR4B and starts the time delay relay TD. Also, as long as relay CR3 is energized, relay contact CR3C is closed, thus providing power to the welder. With contacts CR4B closed, contacts CR4A open thus shutting off power to relay CR3. This causes a reversal of the polarity on the switch contacts S4 because relay contacts CR3A open and contacts CR3B close. When the time delay relay TD times out, the contacts TDA close energizing CR1 which opens the contacts CR1A and closes contacts CR1B. This removes all power from the unit and automatically stops it. A resistor R1 connected to the output of switch 54 is provided to prevent current surges when polarity is reversed through switch S4 which could otherwise harm the control circuitry. Once off, the unit will remain in this condition until CR1 is de-energized by shutting off the power switch S1.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An autoamtic welding turntable for welding a substantially circular device such as a torque converter, said welding turntable comprising:
    (a) holder means for supporting said torque converter;
    (b) bearing means for supporting said holder means and for permitting said holder means to rotate with respect to a supporting surface;
    (c) power means operatively associated with said holder means for causing said holder means to rotate in a first direction with respect to said supporting surface;

(d) control means operatively associated with said power means for causing said holder means to automatically rotate at least 360 degrees and stop, said control means including sensor means for generating a signal when said holder means has rotated 360 degrees; and (e) means for selectively overriding said signal from said sensor means, permitting said power means to continue to rotate said holder means in said first direction.

2. The welding turntable of claim 1 wherein said power means is also adapted to rotate said holder means in a reversed direction from said first direction, said control means including means for causing said power means to rotate said holder means a predetermined increment in said reverse direction.

3. The welding turntable of claim 1, said holder means including an aperture for receiving a projecting hub of said torque converter, further including adjustment means for enabling projecting hubs of a plurality of sizes to be closely received within said aperture.

4. The welding turntable of claim 3 wherein said adjustment means includes a plurality of bushings each having an outer diameter to fit said aperture and an inner diameter to fit one of said plurality of sizes of said projecting hubs.

5. A method for welding together two substantially circular halves of a cut-apart torque converter comprising:

(a) providing a turntable for rotating said torque converter about its axis;

(b) positioning a welding device at a seam which is formed by the mating of said two halves of said cut-apart torque converter;

(c) operating said welding device while rotating said torque converter 360 degrees plus a predetermined increment;

(d) stopping the rotation of said torque converter and the operation of said welding device when the torque converter has rotated 360 degrees plus a predetermined increment;

(e) performing the operations set forth in steps (c) and (d) automatically;

(f) providing a reference which rotates with said torque converter, providing a sensor for generating a signal whenever said reference passes said sensor, positioning said sensor so that said reference will pass proximate said sensor each time said torque converter rotates 360 degrees;

(g) permitting said reference to pass said sensor twice in step (c); and (h) overriding said signal the first time said reference passes said sensor.

6. The method of claim 5 including the step of automatically counter-rotating said torque converter said predetermined increment.

7. The method of claim 5, including providing a crack at said seam between said two halves of said cut-apart torque converter and arranging said torque converter on said turntable so that said crack faces upwardly.

8. The method of claim 7, including tilting said torque converter and said turntable so that said axis of said torque converter is substantially 45° from vertical, and arranging said welding device at the uppermost portion of said seam.

* * * * *

UNITED STATES PATENT AND TRADEMARK OFFICE
CERTIFICATE OF CORRECTION

PATENT NO. : 4,831,234
DATED : May 16, 1989
INVENTOR(S) : John E. Myers

It is certified that error appears in the above-identified patent and that said Letters Patent is hereby corrected as shown below:

Col. 1, Line 14:   Change "wled" to --weld--.
Col. 2, Line 49:   Change "tiled" to --tilted--.
Col. 4, Line 17:   Change "poer" to --power--.

Signed and Sealed this

Fourth Day of June, 1991

Attest:

HARRY F. MANBECK, JR.

*Attesting Officer*   *Commissioner of Patents and Trademarks*